Nov. 26, 1957 B. D. LOUGHLIN 2,814,778

SIGNAL-MODIFYING APPARATUS

Original Filed Feb. 26, 1953 2 Sheets-Sheet 1

United States Patent Office 2,814,778

Patented Nov. 26, 1957

2,814,778

SIGNAL-MODIFYING APPARATUS

Bernard D. Loughlin, Lynbrook, N. Y., assignor to Hazeltine Research, Inc., Chicago, Ill., a corporation of Illinois Original application February 26, 1953, Serial No. 339,145. Divided and this application November 5, 1954, Serial No. 466,999

17 Claims. (Cl. 332—1)

*General*

Figures 1, 3:
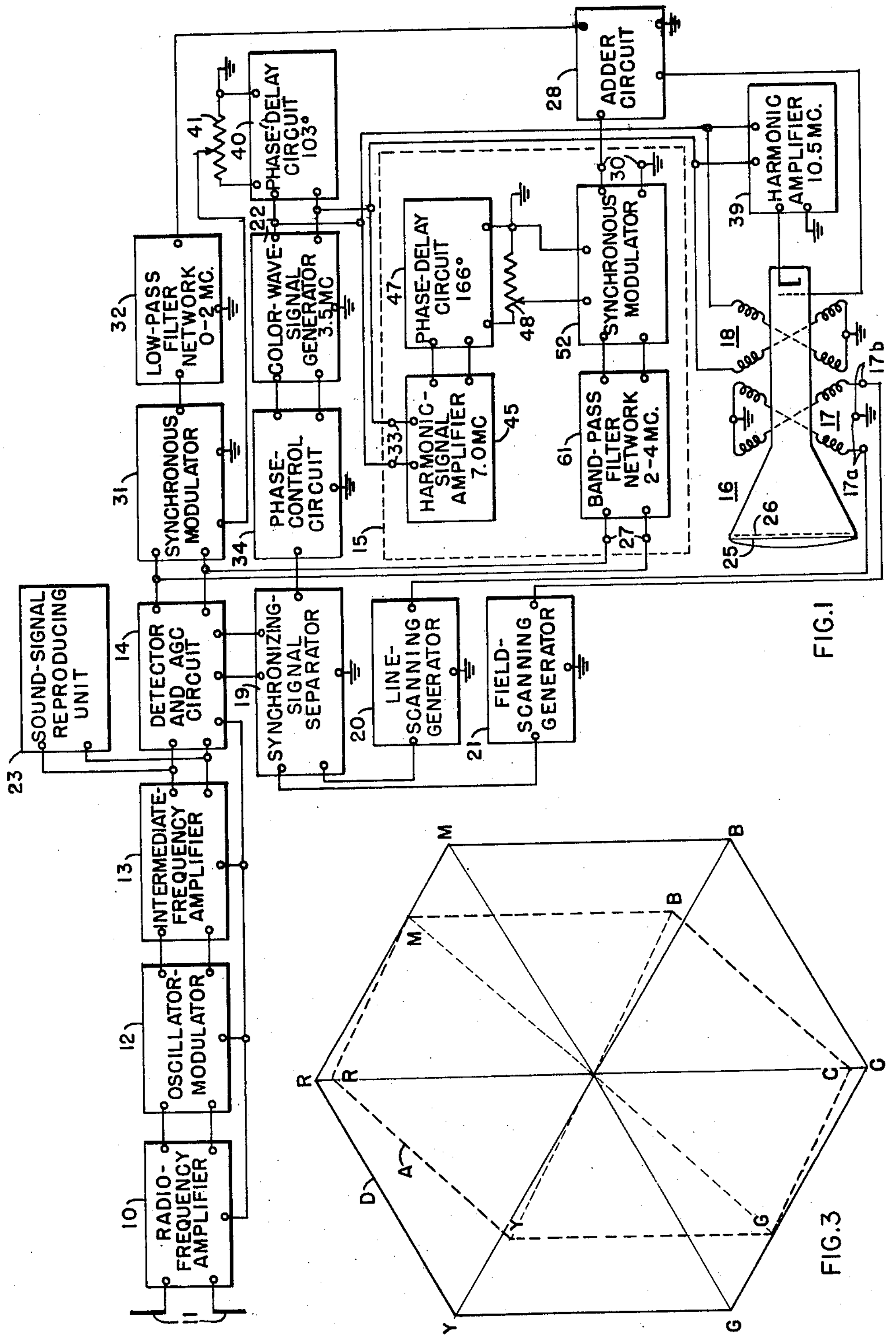

The present invention relates in general to signal-modifying apparatus and particularly, though not limited thereto, to signal-modifying apparatus in color-television receivers for utilizing an NTSC type of color-television signal for modifying the relative phases and intensities of the modulation components of the received subcarrier wave signal. This application is a divisional application from copending application Serial No. 339,145, filed February 26, 1953, and entitled "Color-Television Receiver."

An NTSC type of color-television signal has a monochrome signal which includes the luminance information and a subcarrier wave signal which includes the chrominance information of a televised color image. When such signals are utilized in the proper manner in a color-television receiver, for example, when the monochrome signal is translated through one channel to contribute luminance and the modulation components of the subcarrier wave signal are derived in another channel to contribute solely chromaticity, as occurs when a shadow-mask, three-gun color-television tube is employed, the benefits of constant luminance such as described in detail in applicant's copending application Serial No. 159,212, filed May 1, 1950, and entitled "Color-Television System" are obtained. Use of such a three-gun image-reproducing tube permits both derivation of the signals representative of the three primary colors and proper relative proportioning of the intensities thereof prior to their being applied to such guns. Such control of the modulation components of the subcarrier wave signal, in the form of derived signals, assures that these signals will provide only the chromaticity in the reproduced image and will not affect luminance.

In an article entitled "General description of receivers for the dot-sequential color television system which employ direct-view tri-color kinescopes," in the June 1950 issue of the RCA Review at pages 228–232, inclusive, there is described a color image-reproducing tube having a single electron gun and, therefore, a single electron beam so arranged as to produce a color image from three primary colors. It is proposed that a tube of this type be utilized in a color-television receiver in such manner that a composite video-frequency signal such as described above and having both monochrome-signal components representative of the luminance of an image and a modulated subcarrier wave signal including modulation components representative of the chromaticity thereof be applied to a control electrode of the tube. The separation from each other of the color-signal components relating to the primary colors then occurs as the electron beam in the tube travels from the control electrode thereof to the image screen thereof. To effect the latter result, the image screen of the tube is composed of an orderly array of small, closely spaced dots or elemental areas arranged in substantially triangular groups, each group comprising a dot for developing green, a dot for developing red, and a dot for developing blue. A mask having apertures suitably located with respect to the dots is positioned between the screen and the electron gun. A magnetic field, rotating at the frequency of the color wave signal, is developed around the neck of the tube at a point between the control electrode and the image screen thereof and causes the electron beam continuously to rotate in a tight helix at the frequency of the color wave signal. By proper phasing of the rotational field with relation to the phase of the composite video-frequency signal applied to the control electrode of the cathode-ray tube, at any instant the electron beam can be caused to pass through the mask at such an angle as to fall at that instant upon a dot for developing any selected one of the three colors. At the instant when the beam is directed at one dot on the screen, the color signal corresponding to that dot and which is a component of the composite video-frequency signal is applied to the control electrode of the tube effectively as a pulse and, in this way, intensity-modulates the dot to develop the proper color.

If a composite video-frequency signal of the NTSC type such as described with respect to the three-gun picture tube is applied to the control electrode of a single gun tube of the type just considered, the image reproduced therein does not faithfully reproduce the colors of the televised image. This lack of fidelity results from the fact that such a composite video-frequency signal is purposely developed at the transmitter to have the components thereof in particular phase and intensity relationships to assure that the monochrome signal provides the luminance information while the chrominance or subcarrier wave signal provides the chrominance information and does not disturb luminance. Particularly, at the transmitter the modulation components of the subcarrier wave signal are controlled in relative intensity and in the phases at which they modulate the subcarrier wave signal so that the relative proportions of these components may be varied at the receiver to produce constant luminance in the reproduced image. The operation of a single gun color tube of the type discussed above is normally symmetrical when deriving the signals representative of the different primary colors, that is, the derived signals are taken from equally spaced phases of the subcarrier wave signal with uniform gain or attenuation. Consequently, the resultant image lacks color fidelity and the chrominance signal tends to disturb the luminance thereof. To minimize these undesirable effects, it is desirable that the composite video-frequency signal be modified prior to application to the picture tube. The monochrome component thereof should be precompensated to effect cancellation of the luminance disturbances which the derived color signals tend to cause, and the relative phasing and intensities of the modulation components of the subcarrier wave signal should be modified to assure that they may be properly derived by a symmetrical system faithfully to reproduce the televised colors.

The application of which this is a division describes apparatus for modifying the monochrome and subcarrier wave signals to accomplish the above-mentioned results. In such application circuits for effecting modification of the modulation components of the subcarrier wave signal are described. In one of these circuits the modulation components are initially derived from the received subcarrier wave signal, are individually modified, and are then employed to modulate another subcarrier wave signal at symmetrically disposed phases. In addition such application describes signal-modifying apparatus for correcting the relative phasing and intensities of the modulation components of the received subcarrier wave signal without deriving such components from the subcarrier wave signal. In other words, apparatus is described for modifying the received subcarrier wave signal directly into a resultant subcarrier wave signal suitable for use in a one gun picture tube of the type previously mentioned herein. The present application is directed specifically to the last-mentioned signal-modifying apparatus.

It is an object of the present invention to provide new and improved signal-modifying apparatus for directly modifying the modulation components of a modulated wave signal without deriving such components from the wave signal.

It is another object of the present invention to provide new and improved signal-modifying apparatus for directly modifying the modulation pattern of a wave signal modulated in phase and amplitude by components individually representative of different elements of information.

It is an additional object of the present invention to provide new and improved signal-modifying apparatus for modifying a wave signal, modulated at predetermined phases by components having predetermined relative intensities, to a resultant wave signal modulated at phases different from said predetermined phases by the same components having relative intensities different from the predetermined relative intensities.

Finally, it is an object of the present invention to provide new and improved signal-modifying apparatus in a color-television receiver for utilizing an NTSC type of color-television signal in which the quadrature modulation components of the subcarrier wave signal thereof are modified to other than quadrature modulation components without derivation of such components from the wave signal.

In accordance with the present invention there is provided a signal-modifying apparatus comprising a circuit for supplying a first wave signal modulated in phase and amplitude in a predetermined modulation pattern by components individually representative of different elements of information. The apparatus also includes a circuit for supplying another signal which is harmonically related to the aforesaid wave signal. Finally, the apparatus includes means coupled to the supply circuits for translating the first wave-signal components with original phase sequence and for deriving wave-signal components of reversed phase sequence and for combining the components of original and reversed phase sequence for developing a resultant wave signal modulated in a different modulation pattern.

For a better understanding of the present invention, together with other and further objects thereof, reference is had to the following description taken in connection with the accompanying drawings, and its scope will be pointed out in the appended claims.

Figure 4:
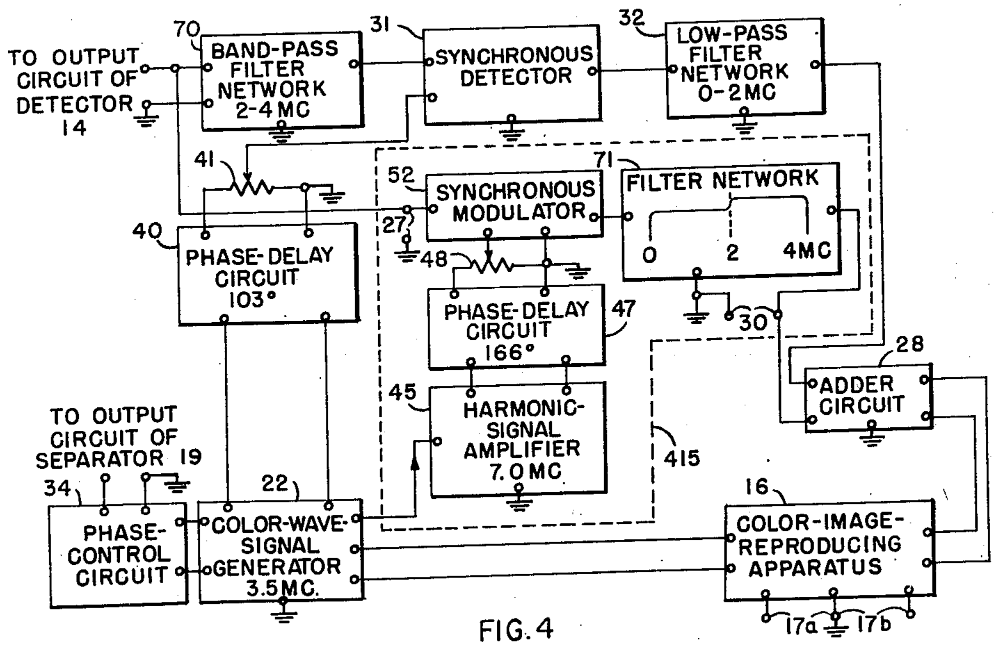

Referring to the drawings:

Fig. 1 is a schematic diagram of a color-television receiver embodying a signal-modifying apparatus in accordance with one form of the present invention;

Figs. 2*a*–2*e*, inclusive, are vector diagrams of modulation signals helpful in explaining the operation of the embodiment of Fig. 1;

Fig. 3 is an explanatory chart useful in explaining the operation of the embodiment of Fig. 1; and Fig. 4 is a schematic diagram of a modified signal-modifying apparatus in accordance with the present invention.

*General description of color-television receiver of Fig. 1*

Referring to Fig. 1 of the drawings, there is represented a color-television receiver corresponding to that represented by Fig. 1 of copending application Serial No. 339,145 modified to include the unit represented by Fig. 4 of that application. The receiver of Fig. 1 herein embodies a signal-modifying apparatus in accordance with one form of the invention. This receiver includes a radio-frequency amplifier 10 of any desired number of stages having its input circuit connected to an antenna system 11, 11. Coupled in cascade with the output circuit of the amplifier 10, in the order named, are an oscillator-modulator 12, an intermediate-frequency amplifier 13 of one or more stages, a composite video-frequency signal detector and automatic-gain-control (A. G. C.) circuit 14, a synchronous modulator 31, a low-pass filter network 32, an adder circuit 28, and a color image-reproducing apparatus 16. The synchronous modulator 31, as described more fully in the copending application Serial No. 339,145, and in a manner to be explained more completely hereinafter, has the structure of a conventional modulator for deriving from the subcarrier wave signal applied thereto an M–Y correction signal which combines with the low-frequency luminance signal translated through the modulator to precorrect such luminance signal to compensate for the luminance disturbances which the derived color signals tend to cause. The color image-reproducing apparatus 16 is, for example, of a so-called single electron-gun type as described in the RCA Review article previously referred to and includes conventional beam-deflecting windings 17 as well as auxiliary deflection windings 18, an apertured mask 26, and an image screen 25.

There is also coupled to the detector 14 a synchronizing-signal separator 19 having output circuits connected through a line-scanning generator 20 and a field-scanning generator 21, respectively, to line-deflection and field-deflection portions of the beam-deflecting windings 17 in the image-reproducing apparatus 16. Another output circuit of the separator 19 is connected through a phase-control circuit 34 to a color wave-signal generator 22. The unit 22 is a sine-wave signal generator for developing at the receiver a signal corresponding in frequency to, and with a predetermined phase with respect to, the subcarrier wave signal. The unit 34 effects such phase control. The output circuit of the generator 22 is coupled through a phase-delay circuit 40, having a delay equivalent to a phase angle of 103° of the 3.5 megacycle generated signal, and a voltage divider 41, in cascade, to an input circuit of the modulator 31. The generator 22 is also coupled through a harmonic amplifier 39, for developing a signal three times the frequency of the signal developed in the generator 22, to the cathode circuit of the picture tube 16, and through a pair of terminals 33, 33 to another harmonic-signal amplifier 45 in a signal-modifying apparatus 15, constructed in accordance with the present invention. The output circuit of the apparatus 15 is coupled through a pair of terminals 30, 30 to an input circuit of the adder circuit 28.

The output circuit of the detector 14 is also coupled through a pair of terminals 27, 27 to a band-pass filter network 61 in the apparatus 15, and the output circuit of the A. G. C. supply included in the unit 14 is connected to the input circuits of one or more of the tubes of the radio-frequency amplifier 10, the oscillator-modulator 12, and the intermediate-frequency amplifier 13 in a well-known manner. A sound-signal reproducing unit 23 is also connected to an output circuit of the intermediate-frequency amplifier 13 and may include one or more stages of intermediate-frequency amplification, a sound-signal detector, one or more stages of audio-frequency amplification, and a sound-reproducing device.

It will be understood that the various units thus far described may have any conventional construction and design the details of which the well known in the art or fully considered in the copending application Serial No. 339,145, rendering a further description thereof unnecessary.

*General operation of color-television receiver of Fig. 1*

Considering briefly the operation of the receiver of Fig. 1 as a whole and assuming for the moment that the unit 15 includes a conventional chrominance channel for translating the modulated subcarrier wave signal, a desired modulated color-television wave signal is intercepted by the antenna system 11, 11, selected and amplified in the radio-frequency amplifier 10 and applied to the oscillator-modulator 12 wherein it is converted into an intermediate-frequency signal. The latter signal is then selectively amplified in the unit 13 and applied to the detector 14 wherein its modulation components including the above-mentioned composite video-frequency signal are derived. The composite video-frequency signal is applied to the modulator 31 to develop, in a manner to be explained more fully hereinafter, a correction signal M–Y from the subcarrier wave-signal component of the composite video-frequency signal and to combine the correction signal with the low-frequency component, that is, the 0–2 megacycle component of the monochrome signal translated through the modulator 31 to precorrect such monochrome signal for luminance disturbances which the derived color signals tend to cause. The chrominance signal, that is, the modulated subcarrier wave signal and high-frequency luminance components are translated through the unit 15, modified therein in a manner to be explained more fully hereinafter, and combined with the low-frequency monochrome signal in the adder circuit 28 to develop a modified composite video-frequency signal which is applied to the intensity-control electrode circuit of the image-reproducing device 16.

The synchronizing-signal components of the signal derived in the detector 14 are separated from the video-frequency components in the separator 19 and are used to synchronize the operation of the line-scanning and field-scanning generators 20 and 21, respectively, with corresponding units at the transmitter. These generators supply signals of saw-tooth wave form which are properly synchronized with reference to the transmitted television signal and which are applied to the deflection windings 17 of the cathode-ray tube of the image-reproducing device 16, thereby to deflect the cathode beam of the tube in two directions normal to each other. A color-synchronizing signal is separated from the other signals in the separator 19 and applied to an input circuit of the phase-control circuit 34 wherein it is utilized to control the phase of the sine-wave signal developed in the generator 22 so that there is a specific phase relation between the signal developed in the generator 22 and the modulated subcarrier wave signal at all times. The phase-controlled locally generated signal is applied to an auxiliary deflection coil 18, and is used in the harmonic amplifier 39 to develop a signal which is the third harmonic thereof, the harmonic signal being applied to the cathode of the picture tube.

In the picture tube an electron beam is developed and directed toward the screen 25 through the apertures in the mask 26. This beam is effectively pulsed from a state of nonconduction to a state of conduction by the third harmonic signal applied to the cathode of the picture tube at a rate three times the frequency of the modulated subcarrier wave signal. The conduction periods, if the phasing of the signals applied to the picture tube is properly adjusted, occur at times corresponding to the phases on the subcarrier wave signal applied to the control electrode of the picture tube at which the three color signals appear as modulation components. The deflection windings 18 utilize the 3.5 megacycle signal applied thereto to effect rotation of the beam emitted from the electron gun at a 3.5 megacycle rate. Such rotation is effective, in cooperation with the pulsing of the control electrode circuit of the picture tube, to derive the three color signals from each signal of the applied subcarrier wave signal. The deflection windings 17 effect conventional line and field scanning of the screen 25 by the electron beam. The high-frequency spiralling or rotation of the electron beam, caused by the field developed by the windings 18, as it approaches the apertures in the mask 26 causes the beam sequentially to impinge on the green, red, and blue phosphor dots on the screen 25. By properly adjusting the phasing and synchronization of the signals applied to the windings 18 and the signal applied to the cathode of the picture tube with the subcarrier wave signal applied to the control electrode thereof, the electron beam is caused to fall on the proper phosphor dot at the time when the electron beam is translating a pulse of intensity information representing the degree to which that color phosphor should be excited to reproduce a color image.

The automatic-gain-control or A. G. C. signal derived in the unit 14 is effective to control the amplification of one or more of the units 10, 12, and 13 to maintain the signal input to the detector 14 and to the sound-signal reproducing unit 23 within a relatively narrow range for a wide range of received signal intensities.

The sound-signal modulated wave signal accompanying the desired television wave signal is also intercepted by the antenna system 11, 11 and, after amplification in the amplifier 10 and conversion to an intermediate-frequency signal in the unit 12, is translated through the amplifier 13 to the sound-signal reproducing unit 23. In the unit 23 it is amplified, the sound-signal modulation components are derived therefrom and the latter components are further amplified and utilized to reproduce sound.

The derivation and utilization of an M–Y correction signal in the synchronous modulator 31 have been briefly considered above. In the copending application Serial No. 339,145, there is a complete consideration of such derivation and utilization. Briefly, the monochrome-signal component of the composite video-frequency signal applied to the modulator 31 is conventionally referred to as the Y signal and is composed of specific proportions of the color signals green (G), red (R), and blue (B). The type of brightness signal conventionally utilized in a single-gun tube, such as previously described, is referred to as the M signal and is also composed of specific proportions of the color signals, the proportions of the color signals in the two monochrome signals differing. The difference in such proportions is definable in terms of the proportions of G, R, and B for the M signal minus the proportions of G, R, and B for the Y signal or, in other words, is the M–Y signal which when added to the Y signal converts it to an M signal suitable for use in a single-gun picture tube. Since the M–Y signal is composed of specific proportions of G, R, and B signals and since the latter signals are modulation components of the subcarrier wave signal, there is some phase angle of such subcarrier wave signal at which the signals G, R, and B occur in the proper relative proportions to comprise the M–Y signal. The unit 31 derives the component of the subcarrier wave signal at such phase angle, in this case at an angle lagging the reference angle used in the derivation system, specifically, lagging a phase angle of the signal in the auxiliary winding 18 by 103°. The component additionally is derived in the unit 31 with the proper intensity relative to the amplitude of the applied monochrome signal to develop the M–Y correction signal. The derived M–Y signal is added to the applied Y signal in the modulator output circuit to develop an M monochrome signal. The 0–2 megacycle component of such M signal is translated through the filter network 32 and applied to the adder circuit 28 where it is combined with a modified subcarrier wave signal and the 2–4 megacycle brightness component translated through the unit 15, to be considered more fully hereinafter, to develop a composite video-frequency signal suitable for use in the single-gun picture tube of the image-reproducing device 16.

*Description of signal-modifying apparatus of Fig. 1*

Considering now the signal-modifying apparatus 15 of Fig. 1, such apparatus includes a circuit for supplying a first wave signal modulated in phase and amplitude in a predetermined modulation pattern by components individually representative of different elements of information. More specifically, such circuit comprises a band-pass filter network 61 having a pass band of 2–4 megacycles and having the input circuit thereof coupled through the pair of terminals 27, 27 to the output circuit of the detector 14 and having the output circuit thereof coupled to a synchronous modulator 52. The first wave signal supplied by the network 61 is the previously mentioned subcarrier wave signal having a frequency of approximately 3.5 megacycles and modulated at quadrature phases by components representative of a pair of primary colors of a televised color image and which have predetermined relative intensities. Such modulation causes the subcarrier wave signal to have a definite modulation pattern, that is, to have a definite relationship of color saturation and hue information with respect to the amplitude and phase of the wave signal. This modulation pattern will be discussed more fully hereinafter. More specifically, such components, in the apparatus 15 of Fig. 1, are R–Y and B–Y color-difference signals representative, respectively, of the red and blue of the televised image.

The signal-modifying apparatus 15 also includes a circuit for supplying another signal which is harmonically related to the subcarrier wave signal, specifically, a harmonic-signal amplifier 45 having the input circuit thereof coupled through the pair of terminals 33, 33 to the output circuit of the generator 22 and having the output circuit thereof coupled to a phase-delay circuit 47. The harmonic-signal amplifier 45 can be of a conventional type and develops a signal which is the second harmonic of the signal generated in the generator 22, that is, a signal having the frequency of approximately 7.0 megacycles. By stating that the supplied signal is harmonically related to the subcarrier wave signal, it is meant that the frequencies are related by an integral multiple (which may be unity) and either frequency may be the larger.

The signal-modyifying apparatus also includes means coupled to at least one of the supply circuits for controlling at least the phase end, if necessary, the intensity of the supplied signals with respect to each other. More specifically, such means includes the phase-delay circuit 47 for delaying the phase of the 7.0 megacycle signal developed in the unit 45 by approximately 166° of a cycle of such 7.0 megacycle signal with respect to that of the signal developed in the generator 22 for reasons to be discussed more fully hereinafter. This means may also include a voltage divider 48 coupled to the output circuit of the phase-delay circuit 47 for controlling the intensity of the phase-delayed signal with respect to that of the subcarrier wave signal to a degree to be considered more fully hereinafter.

Finally, the signal-modifying apparatus 15 of Fig. 1 includes the synchronous modulator 52 having input circuits thereof coupled to the filter network 61 and the voltage divider 48 for translating and heterodyning the subcarrier wave signal and the harmonic signal with at least a controlled relative phase relation therebetween and, under some circumstances to be considered hereinafter, with controlled relative intensities for developing a resultant wave signal modulated in a modulation pattern different in amplitude or phase from that of the supplied subcarrier wave signal by the same components as effect the modulation of the supplied subcarrier wave signal. More specifically, such resultant wave signal is modulated at phases different from the predetermined phases of the supplied subcarrier wave signal and the modulation components have relative intensities different from those of the same modulation components of the supplied subcarrier wave signal. Considered in some detail, the synchronous modulator 52 is effective to develop from the heterodyning of the supplied subcarrier wave signal and 7.0 megacycle signal another wave signal having modulation components corresponding to the modulation components of the supplied subcarrier wave signal, but differing in intensity and phase with respect thereto, and in reverse phase sequence with respect to the sequence of the components of the supplied subcarrier wave signal. The synchronous modulator 52 is effective to combine the supplied subcarrier wave signal translated therethrough and the other wave signal having modulation components as just described to develop the aforementioned resultant wave signal. Both the initially developed other wave signal and the finally developed resultant wave signal are equal in frequency to the supplied subcarrier wave signal, that is, both have frequencies of approximately 3.5 megacycles and the modulation components of the resultant wave signal occur at phases other than quadrature while representing the same pair of primary colors as the modulation components of the supplied subcarrier wave signal. Though the characteristics of the signals applied thereto and the utilization of the signals therein are novel, the sturcture of the modulator 52 can be conventional. The output circuit of the synchronous modulator 52 is coupled through the pair of terminals 30, 30 to supply the resultant wave signal, in other words, the modified subcarrier wave signal and the translated 2–4 megacycle monochrome component to the adder circuit 28.

*Operation of signal-modifying apparatus of Fig. 1*

Preliminary to considering the details of operation of the signal-modifying apparatus 15 of Fig. 1, it will be helpful to restate the reasons why such apparatus is desirable in a color-television receiver employing a single-gun picture tube which effectively derives the color signals in a symmetrical manner. As has been previously stated herein, the composite video-frequency signal derived in the output circuit of the detector 14 is so composed at the transmitter that the color components thereof should be derived from predetermnied phases of the sub-carrier wave signal and the relative intensities of such derived signals should be controlled in a predetermined manner. If such is done, the components of such composite video-frequency signal will reproduce the televisied color image in such manner that the monochrome signal contributes substantially all of the luminance information and the modulated subcarrier wave signal provides chormaticity information and, specifically, does not affect the luminance of the reproduced image. However, as pointed out previously, due to the symmetrical operation of a single-gun picture tube in deriving signals with substantially the same gain and uniform phase spacing, such as previously described herein and represented by unit 16, if proper constant luminance and color fidelity are to be retained, the composite video-frequency signal derived in the detector 14 cannot be applied to such picture tube without previous modification of the monochrome and subcarrier wave-signal components thereof. As previously described, the monochrome signal is modified to effect precompensation thereof for those luminance effects which the derived color components tend to develop in the picture tube. More specificaly, an M–Y correction signal is derived and combined with the applied Y signal to develop and M monochrome signal. The M monochrome signal is applied to an input circuit of the adder circuit 28.

The M–Y correction signal compensates only for luminance disturbances in the reproduced image. To obtain color fidelity, in addition to luminance fidelity, the relative phase relations and intensities of the modulation components of the supplied subcarrier wave signal should also be modified so that a deriving device, such as the aforementioned single-gun picture tube which effects symmetrical derivation of the color components, will derive color signals which accurately and faithfully represent the colors of the televised image.

The chart of Fig. 3 indicates the changes required in the phases and intensities of the modulation components of an NTSC signal, represented by dashed-line curve A to correspond to the components of a dot-sequential subcarrier wave signal suitable for use in a single-gun tube such as previously considered herein and represented by solid-line curve D. Curves A and B represent the modulation patterns of the two types of subcarrier wave signals, that is, they represent plots in phase and magnitude of those modulation components of the subcarrier wave signals representing the saturated primary and complementary colors red (R), blue (B), and green (G), and magenta (M), cyan (C), and yellow (Y), with the phase for the red modulation component being the same for the two wave signals. Even a cursory examination of Fig. 3 indicates the need for modifying or molding the modulation pattern of the NTSC subcarrier wave signal into that of the aforementioned dot-sequential subcarrier wave signal if color fidelity is to be obtained.

To effect such remolding of one modulation pattern into another, the modulator 52 in the apparatus 15 operates effectively to shift the phase and vary the amplitude characteristics of the modulated subcarrier wave signal applied thereto from the filter network 61 and having a modulation pattern such as represented by curve A of Fig. 3 so that such wave signal is effectively remolded into a resultant subcarrier wave signal in the output circuit of the unit 52 which has a modulation pattern such as represented by curve D of Fig. 3. This remolding operation is obtained by causing the supplied subcarrier wave signal having a frequency of 3.5 megacycles to heterodyne with an unmodulated 7 megacycle wave signal of specific phase and magnitude. The latter signal is developed in the amplifier 45 and applied through the phase-delay circuit 47 and the voltage divider 48 to another input circuit of the modulator 52. The heterodyning of these signals is effective to develop a resultant 3.5 megacycle signal having the modulation components symmetrically disposed thereon in the manner represented by curve D of Fig. 3.

To understand the development of this resultant signal, it will be helpful to consider the vector diagrams of Figs. 2*a*–2*e*, inclusive. The diagram of Fig. 2*a* vectorially represents the phase angles and relative intensities of the red ($r_1$ and blue ($b_1$) modulation components of the subcarrier wave signal applied by means of the terminals 27, 27 to the modulator 52. The $r_1$ and $b_1$ components are independent modulation components defined as follows:

$$r_1=\frac{R-Y}{n} \quad (1)$$

$$b_1=\frac{B-Y}{p} \quad (2)$$

The signal representative of green ($g_1$) is determined by the relative amounts of the $r_1$ and $b_1$ components at the phase angle at which the $g_1$ component is derived from the subcarrier wave signal and is defined:

$$g_1=h(G-Y) \quad (3)$$

The terms $n$, $p$, and $h$ represent the relative intensities of the three signals.

It is desired to derive from the subcarrier wave signal in the single-gun picture tube and at 120° phase intervals the color-difference signals $g_m$, $r_m$, and $b_m$ defined as follows:

$$g_m=0.67G-0.33R-0.33B \quad (4)$$
$$r_m=0.67R-0.33G-0.33B \quad (5)$$
$$b_m=0.67B-0.33G-0.33R \quad (6)$$

Figure 2A:
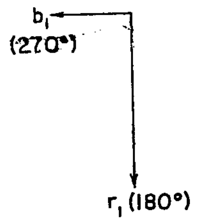
Figure 2D:
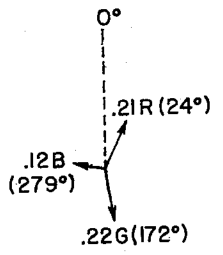
Figure 2C:
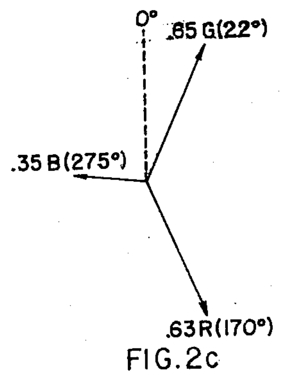
Figure 2B:
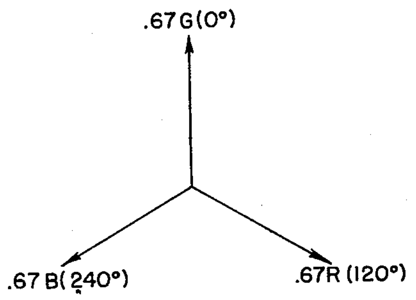

The angular relationships and relative intensities of the latter signals, expressed in terms of the color signals G, R, and B, are vectorially represented by Fig. 2*b*. Fig. 2*c* represents the angular relationships and relative intensities of the color signals G, R, and B as disposed on the subcarrier wave signal applied to the unit 52. The information for developing Fig. 2*c* is obtainable by considering the relative proportions of the signals G, R, and B in the components $r_1$ and $b_1$ as defined by Equations 1 and 2, assuming $n$ to be 1.12 and $p$ to be 2.75. It is apparent that the subcarrier wave signal having the G, R, and B signals, as represented by the vectors of Fig. 2*c* differs from the desired subcarrier wave signal having the signals G, R, and B, as represented by the vectors of Fig. 2*b*. In order to modify the subcarrier wave signal applied to the unit 52 to one having the signals G, R, and B symmetrically disposed as components thereof and as represented by the vectors of Fig. 2*b*, a 3.5 megacycle beat signal is developed in the unit 52 by the heterodyning of the 7 megacycle signal applied thereto from the amplifier 45 and the 3.5 megacycle subcarrier wave signal applied thereto from the terminals 27, 27. This beat signal, having the same frequency as the subcarrier wave signal but, due to the reversal caused by the heterodyning, having the components G, R, and B in a sequence opposite to that of the applied subcarrier wave signal, combines with the latter signal to develop a resultant subcarrier wave signal. The manner of this combination and of the development of the beat signal will now be discussed in more detail.

Figure 2E:
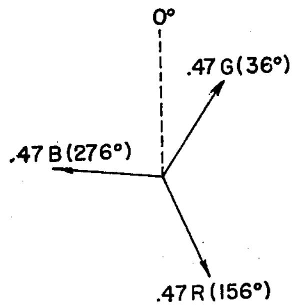

A comparison of the relative phases and intensities of corresponding ones of the vectors representing the signals G, R, and B in Figs. 2*b* and 2*c* determines the phases and intensities of the signals G, R, and B desired in the beat signal in order that the beat signal combine with the applied subcarrier signal to develop the desired resultant signal. The relative phases and intensities of the G, R, and B signals of the beat signal are vectorially represented by Fig. 2*d*. Adding of the vectors of Figs. 2*c* and 2*d* results in vectors such as represented by Fig. 2*e*, the latter vectors representing the relative phases and intensities of the signals G, R, and B in the desired resultant signal developed in the output circuit of the synchronous modulator 52. Of course, it should be understood that the intensities of the signals represented by the vectors of Fig. 2*e* are further increased relative to the intensity of the luminance signal to cause the signals G, R, and B to have intensities of approximately .67 with respect to the luminance signal. In addition, phase adjustment of the subcarrier wave signal represented by the vector diagram of Fig. 2*e* is effective to cause the vector .47G to occur at the 0° reference so that decoding of the signals G, R, and B in the picture tube occurs at the proper phases.

The operation of the modulator 52 to develop a beat signal having modulation components, such as represented by the vectors of Fig. 2*d*, and to combine such beat signal with the supplied subcarrier wave signal having modulation components, such as represented by the vectors of Fig. 2*a*, to develop a resultant signal having the desired modulation components in proper phase relationship, such as represented by the vectors of Fig. 2*e*, may be better understood by considering in detail some of the characteristics of a modulator. The modulation process T of a modulator, in other words, the transmittance or gain thereof can be expressed as a function of the amplitude and phase of the second harmonic signal applied thereto and as a function of the inherent signal-translating characteristics of the modulator with no second harmonic signal applied thereto. Thus $$T=1+2m\cos(2\omega t+\theta_2) \quad (7)$$

where the first term represents the average gain of the modulator and the second term represents the gain or transfer variation due to the second harmonic heterodyning signal, $m$ being an intensity factor for the second harmonic signal. If it is assumed that the supplied subcarrier wave signal is $A\cos(\omega t+\theta)$ the output signal S of the modulator then becomes:

$$S=A\cos(\omega t+\theta)+2mA\cos(\omega t+\theta)\cos(2\omega t+\theta_2) \quad (8)$$

The second term of Equation 8 after expansion becomes:

$$mA\,[\cos(3\omega t+\theta+\theta_2)+\cos(\omega t+\theta_2-\theta)]$$

Due to the frequency limitations of the output circuits of the modulator and other circuits for translating the signal developed therein, signals having frequencies higher than the frequency of the supplied subcarrier wave signal and its side bands are not translated. Thus, the higher frequency components of the second term of Equation 8 are not translated and the output signal S is, for all practical purposes, defined as follows:

$$S=A\ [\cos\ (\omega t+\theta)+m\ \cos\ (\omega t+\theta_2-\theta)] \qquad (9)$$

In Equation 9 it should be noted that the output signal contains the supplied subcarrier wave signal represented by the first term thereof and in addition includes another wave signal having the same frequency as the supplied subcarrier wave signal but in which the phase sequence thereof is reversed as indicated by the $-\theta$ term. In addition, the signal represented by the second term has controllable amplitude as represented by the coefficients $m$A and a static phase shift with respect to the supplied subcarrier wave signal as represented by the term $\theta_2$. By properly adjusting the magnitude of $m$ and the phase shift $\theta_2$, the supplied subcarrier wave signal can be remolded from one having modulation components, such as represented by the vectors of Fig. 2*a*, to one having modulation components such as represented by the vectors of Fig. 2*e*.

The phase shift of the applied second harmonic signal which will effect a phase shift $\theta_2$ in the developed beat-frequency signal is, in the embodiment under consideration, one where the phase of the second harmonic signal lags that of the supplied subcarrier wave signal by approximately 166° of a cycle of the second harmonic signal. The phase-delay circuit 47 effects such phase shift. The proper magnitude of the amplitude factor $m$ in Equation 9, in the embodiment under consideration, is obtained by controlling the intensity of the second harmonic signal by means of the voltage divider 48 to be such as so to control the gain of the modulator 52 that the beat frequency signal developed at the output circuit of the modulator has substantially 0.33 the amplitude of the supplied subcarrier wave signal translated through the modulator. By employing such phase shift of the second harmonic signal and such intensity control thereof, the phase and intensity of the beat-frequency signal developed in the output circuit of the modulator, with respect to the supplied subcarrier wave signal translated through the modulator, will be such that these two signals will combine to develop a resultant subcarrier wave signal having symmetrically disposed modulation components such as represented by the vectors of Fig. 2*e*. In order to maintain the proper relative intensities between the monochrome signal translated through the units 31 and 32 and the resultant subcarrier wave signal and translated high-frequency monochrome signal in the output circuit of the modulator 52, the relative gains of the unit 15 with respect to the units 31 and 32 may be properly adjusted. This result may also be obtained by proper relative proportioning of the impedances of the input circuits in the adder circuit 28.

The composite video-frequency signal previously discussed herein as derived in the detector 14 and applied to the modulator 31 and the network 61 does not have the same constants as the NTSC signal now standard in the United States, differing therefrom in the relative magnitudes of the G, R, and B components comprising such video-frequency signal. However, the principles described herein for modifying the received video-frequency signal into one suitable for use in a single-gun color tube such as in the image-reproducing device 16 apply equally well, except for specific intensity and phase values, to modifying an NTSC video-frequency signal for the same purpose.

*Description and explanation of operation of portion of television receiver of Fig. 4*

In the circuit of Fig. 1, considering specifically that equipment coupled between the output circuit of the second detector and the color image-reproducing device, the low-frequency component of the monochrome signal is modified and translated through one channel while the high-frequency component of the monochrome signal and a modified subcarrier wave signal is translated through another channel. These components are combined in an adder circuit. It may be beneficial to translate both the monochrome and subcarrier wave signal, that is the complete composite video-frequency signal, through one channel, thereby minimizing any undesirable effects that might be caused due to differences in the characteristics of a pair of channels. The circuit represented in Fig. 4 is arranged to translate the monochrome and subcarrier wave signals through one channel and to derive the M–Y correction signal in an auxiliary channel. More specifically, the signal-modifying apparatus in the circuits of Fig. 4 not only modifies the subcarrier wave signal in the manner described with reference to Fig. 3 but also is effective to translate the monochrome signal unmodified. In the circuits of Fig. 4, circuit components which are identical with circuit components in the receiver of Fig. 1 are identified by the same reference numerals as employed with respect to such components in Fig. 1.

The circuit of Fig. 4 includes apparatus for deriving the M–Y correction signal, specifically, in cascade, a band-pass filter network 70 having a pass band of 2–4 megacycles, a synchronous detector 31 and a low-pass filter network 32 having a pass band of 0–2 megacycles. The output circuit of the network 32 is coupled to an input circuit of the adder circuit 28. The signal-modifying apparatus 415 of Fig. 4 includes a filter network 71 coupled between the output circuit of the modulator 52 and an input circuit of the adder circuit 28. The filter network 71 has a pass band of 0–4 megacycles which may either be uniform or nonuniform depending upon the degree of adjustment desired in the relative intensities of the modified subcarrier wave signal and the translated low-frequency component of the monochrome signal. In the network 71 the pass band is nonuniform having an attenuation of approximately 3 db for signals in the frequency range of 0–2 megacycles with respect to those in the range 2–4 megacycles. With respect to the signal-modifying apparatus 415 of Fig. 4, it should also be noticed that there is no band-limiting filter coupled to the input circuit of the modulator 52, that is, the full 0–4 megacycle range of the composite video-frequency signal is applied to the input circuit of the modulator 52.

The generator 22, the phase-delay circuit 40, and the detector 31 operate in a manner similar to that of the corresponding units in Fig. 1 to derive the M–Y correction signal. The band-pass filter network 70 assures that, for all practical purposes, only the subcarrier wave signal with its side bands is applied to the detector 31. The high-frequency monochrome components are also translated through the network 70 but are not utilized in the detector 31 and are rejected by the filter network 32. The heterodyning operation in the detector 31 is effective to derive a low-frequency M–Y correction signal and the low-frequency pass band of the filter network 32 assures that only the M–Y correction signal is translated therethrough and applied to the adder circuit 28.

The units 45, 47, 48, and 52 in the signal-modifying apparatus of Fig. 4 operate in the manner described with respect to the corresponding units of Fig. 1 to develop in the output circuit of the modulator 52 the resultant subcarrier wave signal. Additionally, the modulator 52 translates, without modification, the 0–4 megacycle monochrome signal applied thereto. The translated 0–4 monochrome signal and the resultant subcarrier wave signal are translated through the filter network 71 and applied to an input circuit of the adder circuit 28 to combine with the M–Y correction signal also applied thereto to develop the desired composite video-frequency signal for application to the color image-reproducing apparatus 16. As described with reference to the signal-modifying apparatus of Fig. 1, and as indicated by a comparison of the magnitudes of the vectors represented by Figs. 2*b* and 2*e*, the intensity of the resultant subcarrier wave signal usually requires amplification with respect to that of the translated monochrome signal. The nonuniformity of the filter network effects this result by effectively boosting the resultant subcarrier wave signal with respect to the low-frequency monochrome component by a factor of approximately 3 db.

There has been described herein a signal-modifying apparatus for modifying a wave signal having a definite modulation pattern developed by modulation components individually representative of different elements of information into a resultant wave signal modulated by similar components in a different modulation pattern. Specifically, the modified wave signal has been described as a subcarrier wave signal modulated in terms of color information to have a specific modulation pattern which is converted to another wave signal having the same color information and a different modulation pattern. This modification of wave signals has been described as being effected by employing a modulation operation in which a wave signal having modulation components in a reversed phase sequence with respect to those of the applied wave signal is developed and combined with the applied wave signal to provide a resultant or modified wave signal. Though specific modulation circuits have been described to effect this result, it should be understood that the development of such reversed-sequence wave signal and the combination thereof with the supplied wave signal to provide the desired resultant wave signal may be effected by means other than simple modulators and the concept is intended to be of such scope as to apply to such other circuits.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Signal-modifying apparatus comprising: a circuit for supplying a first wave signal modulated in phase and amplitude in a predetermined modulation pattern by components individually representative of different elements of information; a circuit for supplying another signal which is harmonically related to said wave signal; and means coupled to said supply circuits for translating said first wave-signal components with original phase sequence and for deriving wave-signal components of reversed phase sequence and for combining said components of original and reversed phase sequence for developing a resultant wave signal modulated in a different modulation pattern.

2. In a color-television receiver, signal-modifying apparatus comprising: a circuit for supplying a first wave signal modulated in phase and amplitude in a predetermined modulation pattern by components individually representative of different elements of chromaticity of a televised image; a circuit for supplying another signal which is a harmonic of said wave signal and has a predetermined phase relation thereto; means coupled to at least one of said supply circuits for controlling at least the phase of said supplied signals with respect to each other; and signal-modifying means coupled to said supply circuits for translating said first wave-signal components with original phase sequence and for deriving wave-signal components of reversed phase sequence and for combining said components of original and reversed phase sequence for developing a resultant wave signal modulated in a different modulation pattern.

3. In a color-television receiver, signal-modifying apparatus comprising: a circuit for supplying a first wave signal modulated in phase and amplitude in a predetermined modulation pattern by components individually representative of different elements of information; a circuit for supplying another signal which is a second harmonic of said wave signal; and means coupled to said supply circuits for translating said first wave-signal components with original phase sequence and for deriving wave-signal components of reversed phase sequence and for combining said components of original and reversed phase sequence for developing a resultant wave signal modulated in a different modulation pattern.

4. In a color-television receiver, signal-modifying apparatus comprising: a circuit for supplying a first wave signal modulated in phase and amplitude in a predetermined modulation pattern by components individually representative of different elements of information; a circuit for supplying another signal which is harmonically related to said wave signal; means coupled to at least one of said supply circuits for controlling the phase and intensity of said supplied signals with respect to each other; and signal-modifying means coupled to said supply circuits for translating said first wave-signal components with original phase sequence and for heterodyning said wave signal and said other signal with controlled relative phase and intensity relations therebetween for deriving wave-signal components of reversed phase sequence and for combining said components of original and reversed phase sequence for developing a resultant wave signal modulated in phase and amplitude in a different modulation pattern by said components.

5. In a color-television receiver, signal-modifying apparatus comprising: a circuit for supplying a first wave signal modulated in phase and amplitude in a predetermined modulation pattern by components individually representative of different elements of information; a circuit for supplying another signal which is harmonically related to said wave signal; means coupled to at least one of said supply circuits for controlling at least the phase of said supplied signals with respect to each other; and a signal modulator coupled to said supply circuits for translating said first wave-signal components with original phase sequence and for heterodyning said wave signal and said other signal with at least a controlled relative phase relation therebetween for deriving wave-signal components of reversed phase sequence and for combining said components of original and reversed phase sequence for developing a resultant wave signal modulated in phase and amplitude in a different modulation pattern by said components.

6. Signal-modifying apparatus comprising: a circuit for supplying a first wave signal modulated in phase and amplitude in a predetermined modulation pattern by components individually representative of different elements of chromaticity of a televised image; a circuit for supplying another signal which is a second harmonic of said wave signal; means coupled to at least one of said supply circuits for controlling the phase and intensity of said supplied signals with respect to each other; and a signal modulator coupled to said supply circuits for translating said first wave-signal components with original phase sequence and for heterodyning said wave signal and said other signal with at least controlled relative phase and intensity relations therebetween for deriving wave-signal components of reversed phase sequence and for combining said components of original and reversed phase sequence for developing a resultant wave signal modulated in phase and amplitude in a different modulation pattern by said components.

7. In a color-television receiver, signal-modifying apparatus comprising: a circuit for supplying a first wave signal modulated at predetermined phases by components having predetermined relative intensities; a circuit for supplying another signal which is harmonically related to said wave signal; and means coupled to said supply circuits for translating said first wave-signal components with original phase sequence and for deriving wave-signal components of reversed phase sequence and for combining said components of original and reversed phase sequence for developing a resultant wave signal modulated by said components having relative intensities different from said predetermined relative intensities.

8. In a color-television receiver, signal-modifying apparatus comprising: a circuit for supplying a first wave signal modulated at predetermined phases by components having predetermined relative intensities; a circuit for supplying another signal which is harmonically related to said wave signal; and signal-modifying means coupled to said supply circuits for translating said first wave-signal components with original phase sequence and for deriving wave-signal components of reversed phase sequence and for combining said components of original and reversed phase sequence for developing a resultant wave signal modulated by said components at phases different from said predetermined phases.

9. In a color-television receiver, signal-modifying apparatus comprising: a circuit for supplying a first wave signal modulated at predetermined phases by components having predetermined relative intensities; a circuit for supplying another signal which is a harmonic of said wave signal; means coupled to at least one of said supply circuits for controlling the phase and intensity of said supplied signals with respect to each other; and signal-modifying means coupled to said supply circuits for heterodyning said wave signal and said other signal with controlled relative phase and intensity for developing another wave signal having modulation components corresponding to said modulation components of said first wave signal and in reversed phase sequence with respect thereto and for combining said first and other wave signals to develop a resultant wave signal modulated by said components of said first wave signal having relative intensities different from said predetermined relative intensities.

10. In a color-television receiver, signal-modifying apparatus comprising: a circuit for supplying a first wave signal modulated at predetermined phases by components having predetermined relative intensities; a circuit for supplying another signal which is a second harmonic of said wave signal; means coupled to at least one of said supply circuits for controlling the phase and intensity of said supplied signals with respect to each other; and signal-modifying means coupled to said supply circuits for translating said first wave-signal components with original phase sequence and for deriving wave-signal components of reversed phase sequence and for combining said components of original and reversed phase sequence for developing a resultant wave signal modulated at phases different from said predetermined phases by said components having relative intensities different from the said predetermined relative intensities.

11. In a color-television receiver, signal-modifying apparatus comprising: a circuit for supplying a first wave signal modulated at predetermined phases by components having predetermined relative intensities; a circuit for supplying another signal which is a harmonic of said wave signal; means coupled to at least one of said supply circuits for controlling the phase and intensity of said supply signals with respect to each other; and signal-modifying means coupled to said supply circuits for translating said first wave-signal components with original phase sequence and for heterodyning said wave signal and said other signal with controlled relative phase and intensity for deriving wave-signal components of reversed phase sequence and for combining said components of original and reversed phase sequence for developing a resultant wave signal equal in frequency to said first wave signal and modulated at phases different from said predetermined phases by said components having relative intensities different from said predetermined relative intensities.

12. In a color-television receiver, signal-modifying apparatus comprising: a circuit for supplying a first wave signal of approximately 3.5 megacycles modulated at predetermined phases by components having predetermined relative intensities; a circuit for supplying another signal of approximately 7.0 megacycles; means coupled to at least one of said supply circuits for controlling the phase and intensity of said supplied signals with respect to each other; and signal-modifying means coupled to said supply circuits for translating said first wave-signal components with original phase sequence and for heterodyning said wave signal and said other signal with controlled relative phase and intensity for deriving wave-signal components of reversed phase sequence and for combining said components of original and reversed phase sequence for developing a resultant wave signal of approximately 3.5 megacycles modulated by said components having relative intensities different from said predetermined relative intensities.

13. In a color-television receiver, signal-modifying apparatus comprising: a circuit for supplying a first wave signal modulated at quadrature phases by components having predetermined relative intensities; a circuit for supplying another signal which is harmonically related to said wave signal; means coupled to at least one of said supply circuits for controlling the phase and intensity of said supplied signals with respect to each other; and signal-modifying means coupled to said supply circuits for translating said first wave-signal components with original phase sequence and for heterodyning said wave signal and said other signal with controlled relative phase and intensity for deriving wave-signal components of reversed phase sequence and for combining said components of original and reversed phase sequence for developing a resultant wave signal modulated at phases other than quadrature by said components having relative intensities different from said predetermined relative intensities.

14. In a color-television receiver, signal-modifying apparatus comprising: a circuit for supplying a first wave signal modulated at predetermined asymmetrically disposed phases by components having predetermined unequal intensities; a circuit for supplying another signal which is a harmonic of said wave signal; means coupled to at least one of said supply circuits for controlling the phase and intensity of said supplied signals with respect to each other; and signal-modifying means coupled to said supply circuits for translating said first wave-signal components with original phase sequence and for heterodyning said wave signal and said other signal with controlled relative phase and intensity for deriving wave-signal components of reversed phase sequence and for combining said components of original and reversed phase sequence for developing a resultant wave signal modulated at symmetrically disposed phases by said components having equal intensities.

15. In a color-television receiver, signal-modifying apparatus for color-television apparatus comprising: a circuit for supplying a first subcarrier wave signal modulated at quadrature phases by components representative of a pair of primary colors of a televised color image and having predetermined relative intensities; a circuit for supplying another signal which is a harmonic of said wave signal; means coupled to at least one of said supply circuits for controlling the phase and intensity of said supplied signals with respect to each other; and signal-modifying means coupled to said supply circuits for translating said first wave-signal components with original phase sequence and for deriving wave-signal components of reversed phase sequence and for combining said components of original and reversed phase sequence for developing a resultant subcarrier wave signal modulated at phases other than quadrature by components representative of said pair of primary colors and having relative intensities different from said predetermined relative intensities.

16. In a color-television receiver, signal-modifying apparatus comprising: one circuit for supplying a first wave signal modulated at predetermined phases by components having predetermined relative intensities; another circuit for supplying another signal which is a harmonic of said wave signal; a phase-delay circuit coupled to said other supply circuit for controlling the phase of said other signal with respect to said wave signal; intensity-control means coupled to said phase-delay circuit for controlling the intensity of said phase-delayed other signal; and signal-modifying means coupled to said one supply circuit and said intensity-control means for translating said first wave-signal components with original phase sequence and for deriving wave-signal components of reversed phase sequence and for combining said components of original and reversed phase sequence for developing a resultant wave signal modulated at phases different from said predetermined phases by said components having relative intensities different from said predetermined relative intensities.

17. In a color-television receiver signal-modifying apparatus comprising: a circuit for supplying a first wave signal modulated at predetermined phases by components having predetermined relative intensities; a circuit for supplying another signal which is a harmonic of said wave signal; means coupled to at least one of said supply circuits for controlling the phase and intensity of said supplied signals with respect to each other; and a modulator coupled to said supply circuits for translating said first wave-signal components with original phase sequence and for heterodyning said wave signal and said other signal with controlled relative phase and intensity for deriving wave-signal components of reversed phase sequence and for combining said components of original and reversed phase sequence for developing a resultant wave signal modulated at phases different from said predetermined phases by said components having relative intensities different from said predetermined relative intensities.

References Cited in the file of this patent

UNITED STATES PATENTS

| | | |
|---|---|---|
| 2,619,547 | Ross | Nov. 25, 1952 |
| 2,697,744 | Richman | Dec. 21, 1954 |